US008742942B2

(12) United States Patent
Rosen

(10) Patent No.: US 8,742,942 B2
(45) Date of Patent: Jun. 3, 2014

(54) SECURITY DEVICE AND SYSTEM FOR MONITORING PIPES

(75) Inventor: Hermann Rosen, Kastanienbaum (CH)

(73) Assignee: Rosen Swiss AG, Stans (CH)

( * ) Notice: Subject to any disclaimer, the term of this patent is extended or adjusted under 35 U.S.C. 154(b) by 208 days.

(21) Appl. No.: 13/141,406

(22) PCT Filed: Dec. 8, 2009

(86) PCT No.: PCT/EP2009/008758

§ 371 (c)(1), (2), (4) Date: Jul. 11, 2011

(87) PCT Pub. No.: WO2010/072324

PCT Pub. Date: Jul. 1, 2010

(65) Prior Publication Data

US 2011/0260852 A1 Oct. 27, 2011

(30) Foreign Application Priority Data

Dec. 23, 2008 (DE) ......................... 10 2008 063 066
Apr. 21, 2009 (DE) ......................... 10 2009 017 975

(51) Int. Cl.

*G08B 23/00* (2006.01)
*G01H 3/00* (2006.01)
*G01F 17/00* (2006.01)
*B65D 59/06* (2006.01)
*F16L 55/00* (2006.01)
*G08B 13/14* (2006.01)
*G08B 13/00* (2006.01)

(52) U.S. Cl.

USPC ......... 340/693.12; 73/592; 702/54; 138/96 T; 138/104; 340/568.1; 340/566

(58) Field of Classification Search

USPC .............. 340/532, 693.5, 693.12, 568.1, 566; 73/570–672; 702/51, 54, 56; 138/96 R, 138/96 T, 104

See application file for complete search history.

(56) References Cited

U.S. PATENT DOCUMENTS 4,761,638 A * 8/1988 Lozano, Jr. .................. 340/620
4,875,031 A * 10/1989 Filippi et al. ................. 340/605
5,173,684 A * 12/1992 Ijiri et al. ...................... 340/605
RE34,308 E * 7/1993 Thompson et al. ........... 340/679
5,351,036 A * 9/1994 Brown et al. ................. 340/618
6,121,864 A * 9/2000 Tillmann ...................... 335/205

(Continued)

FOREIGN PATENT DOCUMENTS

CA 2608392 A1 11/2006
CH 692 259 A5 4/2002

(Continued)

*Primary Examiner* — Benjamin C Lee
*Assistant Examiner* — Adam Carlson
(74) *Attorney, Agent, or Firm* — Gudrun E. Huckett

(57) ABSTRACT

The invention relates to a security device for a cover device of a pipe and/or for a pipe, that can be used for producing pipelines having a series of further pipes welded to each other, wherein the cover device comprises a sleeve covering an inner wall of the pipe, and the security device is designed for generating an alarm signal, wherein the security device comprises a structure-borne sound detection device comprising a structure-borne sound sensor for detecting manipulation of the pipe. The invention further relates to a system for monitoring pipes having a plurality of security devices having a receiving station for receiving the security device signals, preferably repeatable by means of a repeater, and an electronic data processor designed for analyzing the signals and for out-putting an alarm signal.

29 Claims, 8 Drawing Sheets

(56) References Cited

U.S. PATENT DOCUMENTS

| | | | | |
|---|---|---|---|---|
| 6,406,074 | B1 | 6/2002 | Mahaney | |
| 6,956,493 | B1 * | 10/2005 | Youngblood | 340/693.9 |
| 7,298,279 | B1 | 11/2007 | Badon et al. | |
| 7,668,670 | B2 * | 2/2010 | Lander | 702/51 |
| 7,830,273 | B2 * | 11/2010 | Twitchell, Jr. | 340/870.07 |
| 8,296,083 | B2 * | 10/2012 | Martin | 702/56 |
| 8,384,538 | B2 * | 2/2013 | Breed | 340/500 |
| 2003/0019297 | A1 * | 1/2003 | Fiebelkorn et al. | 73/587 |
| 2004/0232924 | A1 * | 11/2004 | Hilleary et al. | 324/700 |
| 2005/0064755 | A1 | 3/2005 | Lemkuil | |
| 2007/0187299 | A1 * | 8/2007 | Valerio | 209/12.1 |

FOREIGN PATENT DOCUMENTS

| | | | |
|---|---|---|---|
| DE | 37 07 601 | A1 | 9/1988 |
| EP | 1 229 173 | A1 | 8/2002 |
| JP | 08 247 375 | A | 9/1996 |
| RU | 2326444 | C2 | 6/2008 |

* cited by examiner

SECURITY DEVICE AND SYSTEM FOR MONITORING PIPES

BACKGROUND OF THE INVENTION

The present invention relates to a safety device for a covering device of a pipe and/or for a pipe, which can be used with a row of further pipes preferably in a form welded to one another for producing pipelines, wherein the covering device comprises a sleeve covering an inner wall of the pipe and the safety device is embodied to generate an alarm signal. Furthermore, the invention relates to a system for monitoring pipes.

Pipes that are used for pipeline construction must meet the highest quality requirements. The media to be transported through the pipelines, such as, e.g., oil, can cause great damage to the environment if they are assembled incorrectly. Furthermore, damage of this type leads to a high financial strain on the companies operating the pipeline. Before installation in an existing pipeline or before the assembly of several pipes to form a pipeline, particularly the edges and weld regions of the pipes must be particularly well protected. Covering devices can be used for this purpose, which in particular also seal parts of the inner wall located in the ends of the pipe by means of a sleeve or the like. In order to avoid damage due to incorrect use and associated impairment of the integrity of the pipes as well as tampering with the pipes, the transport and the storage of the pipes should be monitored until installation.

The object of the present invention is therefore to create a safety device that is embodied to generate an alarm signal and which can be used for the covering device and/or for a pipe. Furthermore, the object of the present invention is to create a system for monitoring pipes provided for pipeline construction.

SUMMARY OF THE INVENTION

The object is solved in that the safety device for a covering device of a pipe and/or for a pipe, which can be used with a row of further pipes preferably in a form welded to one another for producing pipelines, wherein the covering device comprises a sleeve covering an inner wall of the pipe, is embodied to generate an alarm signal and is characterized in that the safety device comprises a structure-borne sound detection device comprising a structure-borne noise sensor for detecting tampering with the pipe. The object is further solved in that the system for monitoring pipes is characterized by a plurality of safety devices as described above, with a receiving station for receiving the signals of the safety device that can preferably be relayed by means of a repeater, with an electronic data processing system that is embodied to evaluate the signals and to emit an alarm signal. Advantageous further embodiments are set forth in the dependent claims as well as explained by the description below.

According to the invention, the safety device comprises a structure-borne sound detection device comprising a structure-borne noise sensor for detecting tampering with the pipe. Tampering with the pipe is associated, for example, with knocking or welding noises and thus with a characteristic structure-borne noise. The accidental dropping of the pipe during transport also generates structure-borne noise in the pipe. Different structure-borne noise can thus be assigned to characteristic causes. A safety device that has a structure-borne noise detection device with a structure-borne noise sensor can record the structure-borne noise that occurs in the pipe and trigger the output of an alarm signal—preferably with an electronically supported evaluation. The structure-borne noise detection device can have suitable means for evaluating the signal recorded by the sensor for this purpose.

In order to render possible a good recording of the structure-borne noise of the pipe, the structure-borne noise detection device is advantageously adapted to the curvature of the inside of the pipe.

In an advantageous embodiment of the invention, the structure-borne noise detection device is provided with a piezoelectric element, which serves to record the structure-borne noise and convert it into electrical pulses. The piezoelectric element is thus in particular a part of the structure-borne noise sensor.

The piezoelectric element can be embodied, for example, in the manner of a tuning fork in part in a free swinging manner. However, an embodiment is preferred in which the piezoelectric element or another structure-borne noise sensor is arranged on an oscillating body, which, in particular in terms of its characteristic frequency, is adapted to the frequency range of the structure-borne noise to be detected. The oscillating body can be a metal strip, for example, the shape and dimensions of which (e.g., length, width, height) are adapted to the structure-borne noise to be recorded. The oscillating body of the structure-borne noise detection device or of the safety device is hereby to be brought in abutment indirectly or directly against the inside of the pipe wall in order to record the structure-borne noise thereof and to relay or emit it to the piezoelectric element.

The noises to be detected, which continue in the pipe, do not generally concern a single frequency but a plurality of frequencies or a frequency band which is produced, for example, by drilling or knocking on the pipe. For example, this relates to a frequency range between 10 and 20 kHz in which the oscillating body likewise has a characteristic frequency.

When an oscillating body with a coordinated characteristic frequency is used, it is in particular advantageous that the structure-borne noise sensor or the piezoelectric element does not have to abut directly against the inside wall of the pipe. It can be arranged in a correspondingly protected manner. Due to the coordination of the oscillating body, a high sensitivity of the structure-borne noise detection device is nevertheless guaranteed. Furthermore, the piezoelectric element and the oscillating body, if they are cast in a material, for example, are adapted to the damping by this material.

Preferably, the oscillating body itself can be attached using at least one magnet to the inside wall of the pipe to be monitored. That is, the structure-borne noise detection device comprises at least one magnet for holding at least one part of the structure-borne noise detection device on the pipe to be monitored. The pipe is not a part of the invention.

If two magnets are used, which are arranged spaced apart from one another, the magnetic coupling force can be intensified by connecting these two magnets by means of a bridge forming the oscillating body in order to render possible an even better attachment to an inner wall of the pipe. The surfaces of the magnet to be aligned in the direction of the inside of a pipe are hereby likewise adaptable to the wall again, i.e., provided with a corresponding slight curvature or even adjustable.

Alternatively or additionally, the structure-borne noise detection device can be embodied for the mechanical mounting of at least of a part of the structure-borne noise detection device on the pipe. For this purpose, one or more energy storage devices such as, for example, one or more springs can be provided, which can press at least a part of the structure-borne noise detection device, in particular the part having the magnet, oscillating body and piezoelectric element, against the inside of a pipe wall. The rest of the safety device is to be designed so it can be fixed in a corresponding manner, such that the energy storage device can be supported. This can be carried out, for example by the attachment option of screwing the safety device to a covering device.

Preferably, the safety device has a moveable part, in particular a slide, which comprises the magnets, a bridge forming an oscillating body and the piezoelectric element, and which can be brought into abutment against the inside of the pipe wall accordingly based on a combination of magnetic force and/or mechanical force, in particular spring force.

Preferably, the safety device is embodied for the detection of tampering with a covering device on which the safety device in individual cases can be arranged. Accordingly, on the one hand a monitoring of the pipe itself is established against impairments to the integrity thereof as well as a monitoring of the covering device usually covering the pipes at the ends thereof before use.

Advantageously, the safety device can be embodied such that it can be screwed to an inner sleeve of a covering device. In order to be able to detect in particular mechanical damage or other tampering with the covering device, the safety device can have a protector in particular embodied as a cutoff protector for detecting mechanical damage to the covering device. Particularly advantageously, this can be a conductor loop, which can be attached, for example, to a membrane of the covering device. A conductor loop of this type, which can be voltage-carrying or current-carrying, can cover the clear inner cross section of a pipe at least in part and trigger an alarm signal if the conductor elements are severed. Also advantageous is a conductor network under voltage which is applied to the membrane or is embodied as a membrane, wherein the safety device can detect voltage changes associated with damage.

In another advantageous further development of the invention, the safety device comprises a displacement protector, which is embodied to detect a change in the position of the safety device, in particular relative to a pipe to be monitored. A displacement protector of this type can be embodied, for example, in the form of an acceleration sensor which can detect a movement of the safety device. However, an embodiment is particularly advantageous in which the displacement protector comprises a slide subjected to a force, and the safety device furthermore is embodied to emit an alarm signal at the displacement of the slide preferably into the dead-center position thereof. The slide subjected to a force can be supported on the inner wall of the pipe during the operating position of the safety device, if this is arranged in a pipe. If the safety device is removed from the pipe, the slide subjected to a force is pressed outwards. The displacement of the slide relative to the rest of the safety device associated herewith leads to the production of an alarm signal.

Preferably, the safety device has a slide that can be moved in a guide, which slide can take on a plurality of functions, wherein a signal can be produced at at least one position of the slide along the guide. For this purpose, for example, mechanical switches or magnetic switches, like a reed switch that can be actuated by a magnet arranged in the slide, can be provided.

Particularly preferably, the slide is also at the same time a part of the structure-borne noise detection device. For example, a magnet for coupling the outside of the slide to the inner wall of the pipe can be present on the end of the slide visible to the outside. This means at the same time that the slide in addition to any force loading optionally also alternatively to such remains on the wall of a pipe to be monitored, and in this respect the slide in the event of intended tampering undergoes a change of position relative to the rest of the safety device. Again this leads to an alarm signal being emitted.

In a further advantageous embodiment of the safety device, this has a temperature sensor which initiates an alarm when critical temperatures are reached. For example, with the arrangement of the safety device on a covering device or with the integration of the safety device into a covering device, an alarm is emitted when the covering device burns off or is burnt off.

Preferably, the temperature sensor is arranged on an opposite end of the safety device with respect to the structure-borne noise sensor. This ensures that the temperature sensor is not influenced by the temperatures in a pipe wall rising in part to 50°.

Preferably, the temperature sensor is attached via a clamp connection so that the temperature sensor is not already damaged by any soldering operations during the production of the safety device.

In addition to the functions relevant to safety already described, the safety device can also have sensors or devices that react to other environmental variables than sound or temperature. For example, the monitoring of a pipe is further improved when the safety device has at least one moisture probe and/or a gas probe. A safety device according to the invention can furthermore advantageously have a sensor for detecting further parameters that influence corrosion in particular in the air inside the pipe. This can be, e.g., a salt content sensor.

The safety device is embodied to emit an alarm signal, wherein this alarm signal is, for example, a sound emitted by the safety device via a loudspeaker or a luminance signal of a display. However, the safety device is preferably embodied with a transmitter for emitting a radio signal or another signal that can be transmitted wirelessly. For this purpose the safety device is provided with an electronic control for communication in particular causing an alarm signal to be emitted. The communication means are suitable in particular for bidirectional communication. The safety device is thus also able to transmit a status report or the like targeted information upon external inquiry.

A control of this type is particularly advantageous when it is connected to an RFID component, which has a storage device that can be written by known means, in which storage device, for example, storage location IDs or pipe IDs can be stored. In this respect by means of the safety device according to the invention it is possible to identify a pipe and to also communicate this via the electronic control.

Preferably, the safety device is embodied such that it emits a status signal at regular intervals regarding an associated energy source. An energy source of this type is in particular part of an autonomous energy supply, for example, on an accumulator, solar energy or wind energy basis.

In order to embody the safety device to be as safe as possible from environmental influences, it has a two-part external housing, which in an operating position embodies a sealed cavity for accommodating electronic components. This two-part external housing is formed in particular of cast or injection-molded polyurethane and as such is correspondingly solid. Due to the associated sensors, the housing does not need to be composed of materials that are difficult to destroy, since the sensors would detect any tampering attempts beforehand and would emit an alarm accordingly.

The object is further attained through a system for monitoring pipes, which has a plurality of previously described safety devices and furthermore a receiving station for receiving the signals of the safety device that can preferably be relayed by means of a repeater. Furthermore, the system has an electronic data processing system that is embodied to evaluate the signals and to emit an alarm signal.

With a system of this type, in addition to status requests regarding the pipe ID and pipe storage location, for example, temperatures at covering devices on which safety devices are attached or the quantity of the pipes monitored can also be requested regularly and in an uncomplicated manner. Signals of the respective safety devices can be recorded by the receiving station, whereupon the signals are evaluated in the data processing system.

Advantageously, the system furthermore comprises a first control station that at least in part comprises the electronic data processing system, i.e., in which initial evaluations can be carried out, as well as a second control station which is locally spaced apart and connected to the first control station via communication means preferably embodied as an Internet connection. A single storage location equipped with a plurality of pipes and safety devices accordingly associated therewith can thus on the one hand in part be administered locally, but furthermore also be managed from a completely different location, for example, on another continent. In the case of an alarm signal, resources can thus be distributed in a targeted manner and possible problems resolved quickly.

Preferably, the system is embodied such that it comprises safety routines, i.e., that an alarm signal continues to be emitted until a corresponding confirmation signal is sent back to the safety device by a location authorized therewith, for example, in the first or in the second control station.

In a further embodiment, the system can be provided with a protector in which the electronic data processing system for monitoring the at least one repeater is embodied. Any breakdown of individual repeaters is thus recognized before the start of an alarm case, and the fault tolerance of the system is increased.

BRIEF DESCRIPTION OF THE DRAWINGS

Further advantages and details of the invention are shown by the description of the figures below. The figures show diagrammatically.

DESCRIPTION OF PREFERRED EMBODIMENTS

Identical parts or parts with the same effect are—wherever useful—provided with identical reference numbers. Individual technical features of the exemplary embodiments described below can also lead to further developments according to the invention with the features of the exemplary embodiments previously described.

Figure 1:
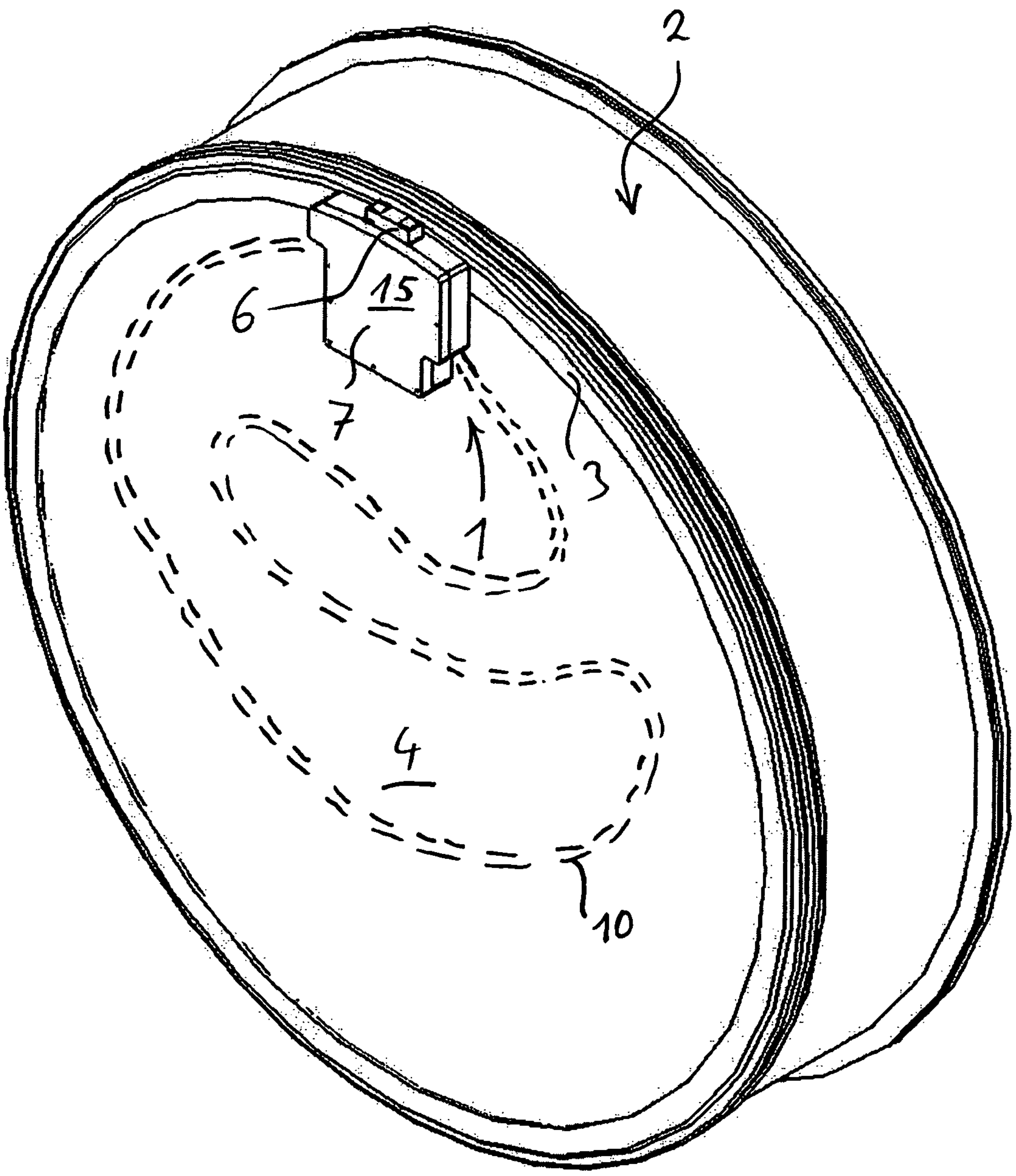
FIG. 1 A perspective representation of a subject matter according to the invention in a position on a covering device, FIG. 2 The subject matter according to FIG. 1 in a multiple-section view, FIG. 3 A safety device according to the invention with opened housing, FIG. 4 The subject matter according to FIG. 3 in a plan view without printed circuit board, FIG. 5 The subject matter according to FIG. 4 in a further view, FIG. 6 The subject matter according to FIG. 4 in a further view, FIG. 7 A detailed view of a subject matter according to the invention, FIG. 8 The subject matter according to FIG. 3 in a rear view.

FIG. 1 shows a safety device 1 according to the invention in its operating position attached to a covering device 2. The covering device 2 is composed of a comparatively strong polyurethane so that the safety device 1 can easily be screwed onto a flange 3.

In a situation in which the covering device 2 together with the safety device 1 to cover a pipe end is inserted therein, the safety device 1 covered by a membrane 4 is located in the interior of the pipe. The safety device 1 is thus accessible from the end of the pipe having the covering device 2 only by destroying the membrane 4 or removing the covering device 2. By means of a slide 6 of the safety device 1, a structure-borne noise detection device is to be brought into abutment against the pipe to be monitored. For this purpose the slide 6 can be moved in the housing until it bears against an inside of a pipe.

A conductor loop 10 indicated merely by broken lines is part of a cutoff protector that serves to monitor the integrity of the membrane 4. If the membrane 4 is cut through, the conductor embodied by the conductor loop 10 is interrupted, which leads to an alarm signal being emitted.

Figure 2:
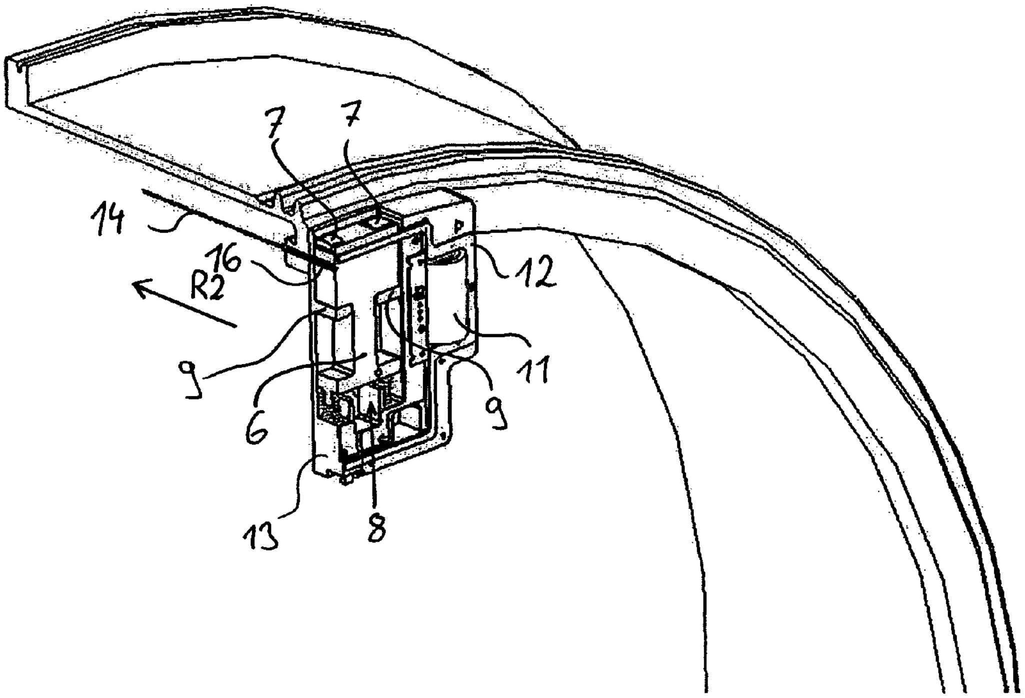

The safety device 1 is shown in more detail in FIG. 2. A multiple-section view of the safety device 1 is shown, wherein the view is formed among other things by the removal of the housing lid 7 still visible in FIG. 1 and a section in the direction R2 parallel to the longitudinal central axis of the covering device.

The figure shows the slide 6 with two magnets 7 in a guide 8. The slide 6 is embodied in the manner of a double T and limited with respect to a maximum rise out of the housing of the safety device 1 by two flanges 9. An accumulator 11 serves the energy supply of the safety device 1, while a seal 12 forms a seal plane that is arranged between the lower housing half 13 shown and the upper housing half 15 visible in FIG. 1.

In the representation shown in FIG. 2, the safety device 1 is shown in an inactive position secured via a pin 16 connected to a chain 14. The safety device can be released and thus switched on by pulling on the chain 14. Due to its release from the blocked position according to FIG. 2, the slide 6 is pressed in a spring force-supported manner in the direction of the inside of a pipe, wherein at the same time the magnets 7 act in a supporting manner. Subsequently, the pin 16 cannot be replaced in the securing position, since, in a situation in which the safety device is inserted in a pipe, the slide 6 is not accessible from outside and cannot be switched off until the cap is removed and the slide 6 pushed in.

Figure 3:
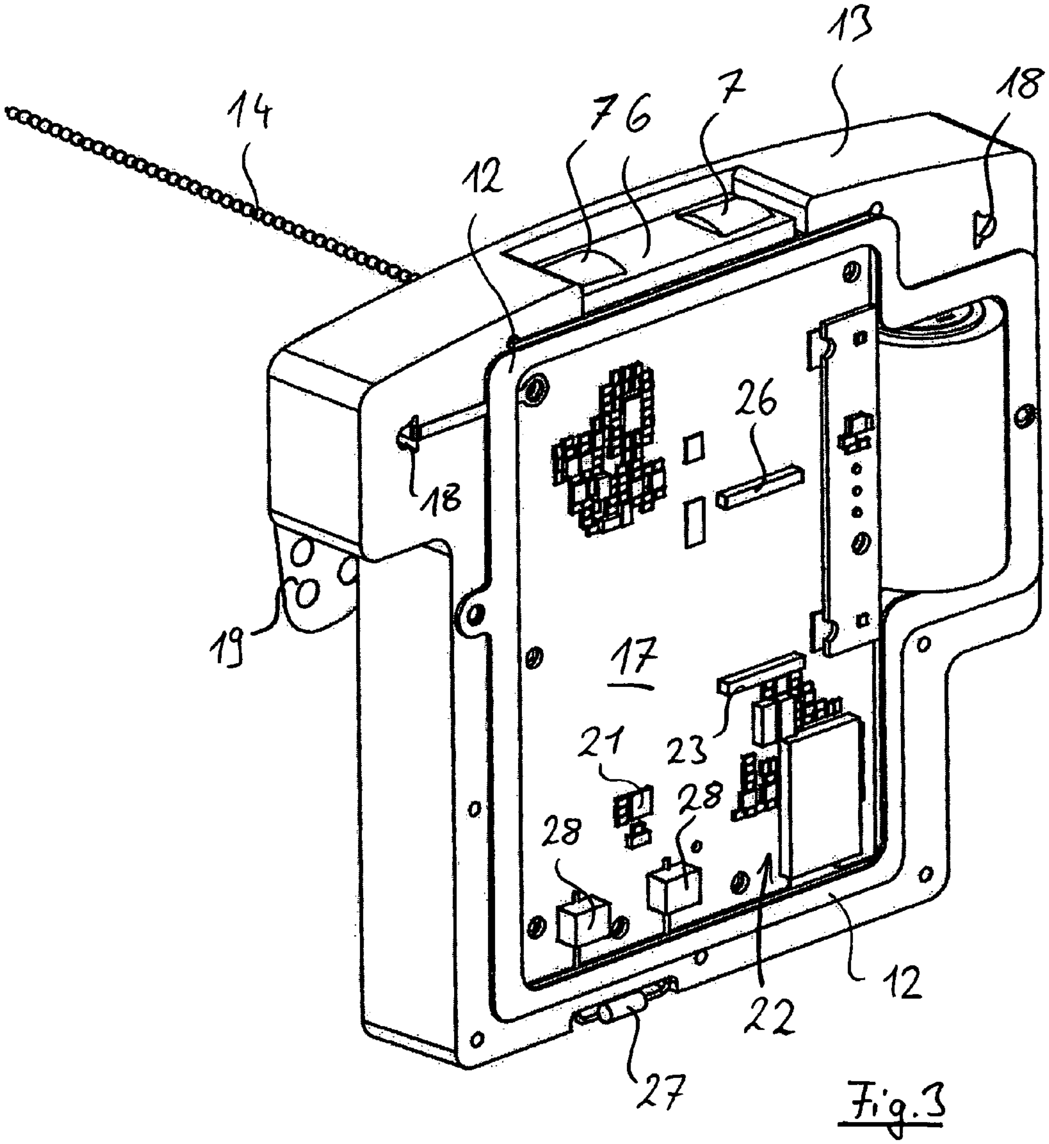

In the view according to FIG. 3, the slide 6 is still in the secured position, which likewise is indicated by the chain 14. At the same time, it is shown that a printed circuit board 17 with a number of electronic components for the control covers the guide 8 for the slide 6. At the same time, the seal 12 serves the sealing of the individual assemblies on the printed circuit board 17. Recesses 18 on the one hand provide an attachment option for attaching to a covering device, on the other hand, through a threaded assembly, a contact is produced to the conductor loop 10 located on the membrane 4 visible in FIG. 1. A contact sheet 19 can likewise serve the contact to the conductor loop 10.

In the case of insertion into a pipe, the safety device can be individualized easily with a pipe identification number and a pipe storage location via an RFID chip 21. For example, bar code readers that read the bar codes usually applied on pipes and accordingly can write an RFID chip can be used for this purpose.

The RFID chip 21 is connected to an assembly 22, which provides a communication interface for communicating with an associated monitoring system.

Figure 4:
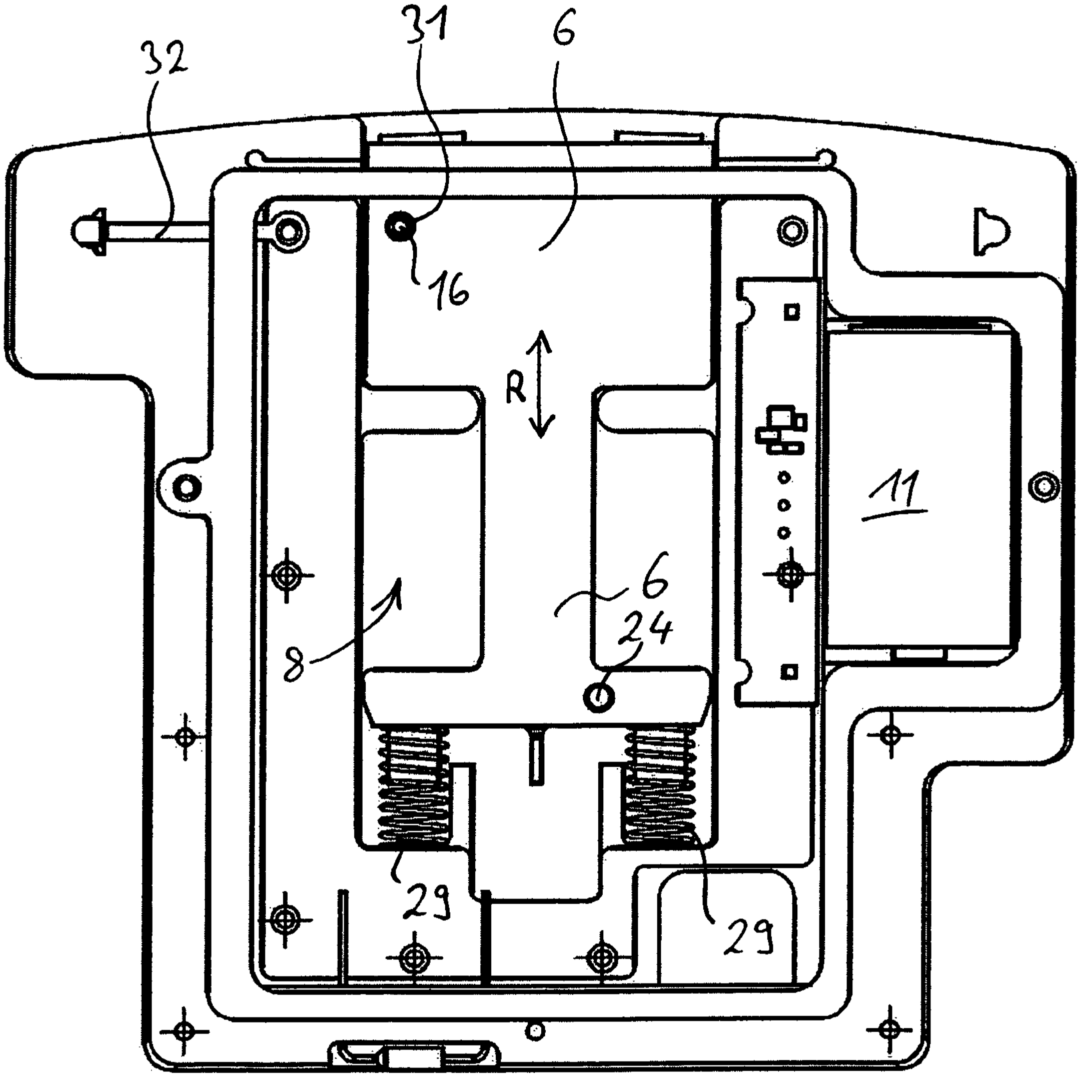

Furthermore, a first 23 is arranged on the printed circuit board 17, which reed switch in FIG. 3 is arranged at the same height as a magnet 24 arranged in the slide 6 (cf. FIG. 4).

A further reed switch 26 can be reached by retracting the slide 6 and represents a displacement protector. In its operating position, the safety device 1 has an embodiment in which the magnet 24 is arranged between the two reed switches 23, 26. When the slide 6 is retracted into its dead-center position, the magnet 24 of the slide 6 reaches the area of the switch 26 and an alarm signal is emitted, since this position can be reached by removing a pipe. This occurs, for example, when the covering device is removed from the pipe and the slide 6 no longer bears against the inner wall of the pipe.

On the lower side of the safety device in FIG. 3 a thermal fuse 27 is arranged on the end opposite the magnets 7, which thermal fuse is attached in clip holders or clamp holders 28. A further seal plane is located under the seal 12 between the printed circuit board 17 and housing 13.

The slide 6 is arranged in its guide 8 so as to be moveable in the direction R. Two energy storage devices 29 effect a preload of the slide 6 in the securing position shown in FIG. 4 in which the securing pin 16 is arranged in a recess 31 of the slide 6.

A metal strip 32 serves to connect the conductor loop 10 to the printed circuit board 17.

Figure 5:
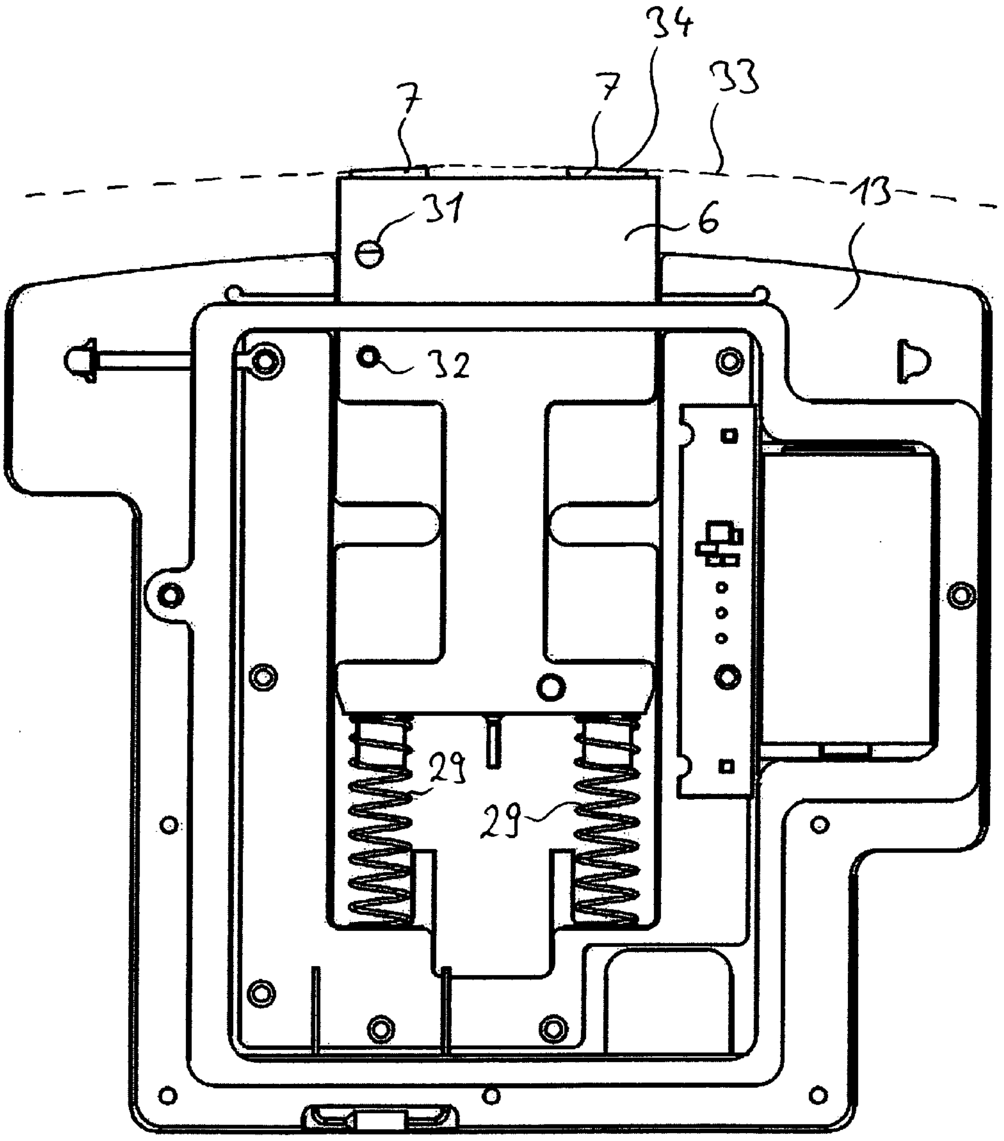

When the securing pin 16 is removed, the magnet 24 leaves the reed contact 23, whereupon the entire safety device is armed. Since the slide hereby changes from its position showed in FIG. 4 into the operating position shown in FIG. 5, the recess 31 is no longer at the same level as the recess 32 of the housing 13 still indicated in the figure. The securing pin can thus no longer be inserted into the device, and the safety device can therefore no longer be switched off. In the position shown in FIG. 5, the slide has been retracted up to the level of the pipe inner wall 33 shown by a broken line. In this position the magnets 7, which are cast in the slide and emerge partially therefrom, are arranged on the inside wall of the pipe. The magnets 7 have a slightly rounded surface for this, which improves the abutment.

Figure 6:
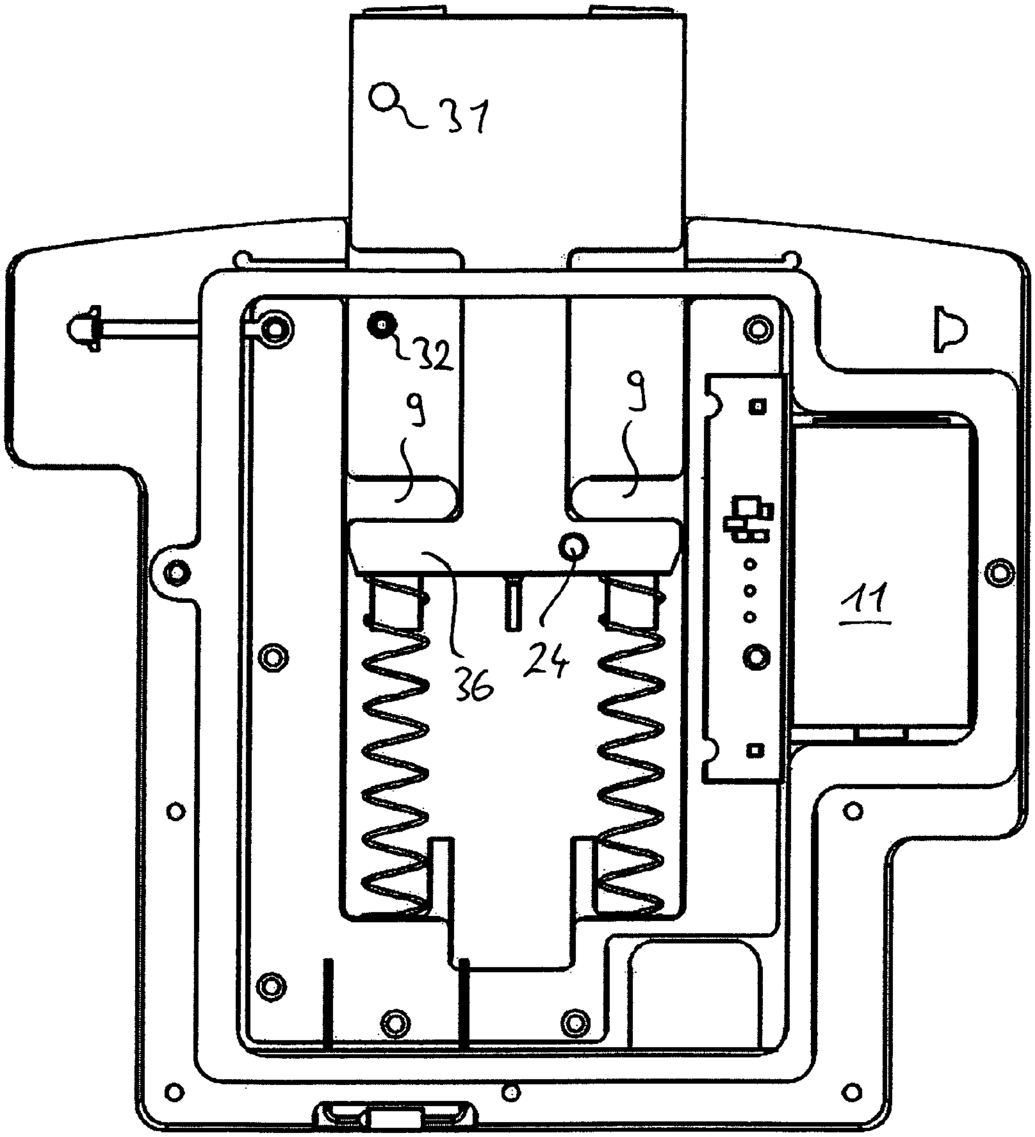
Figure 7:
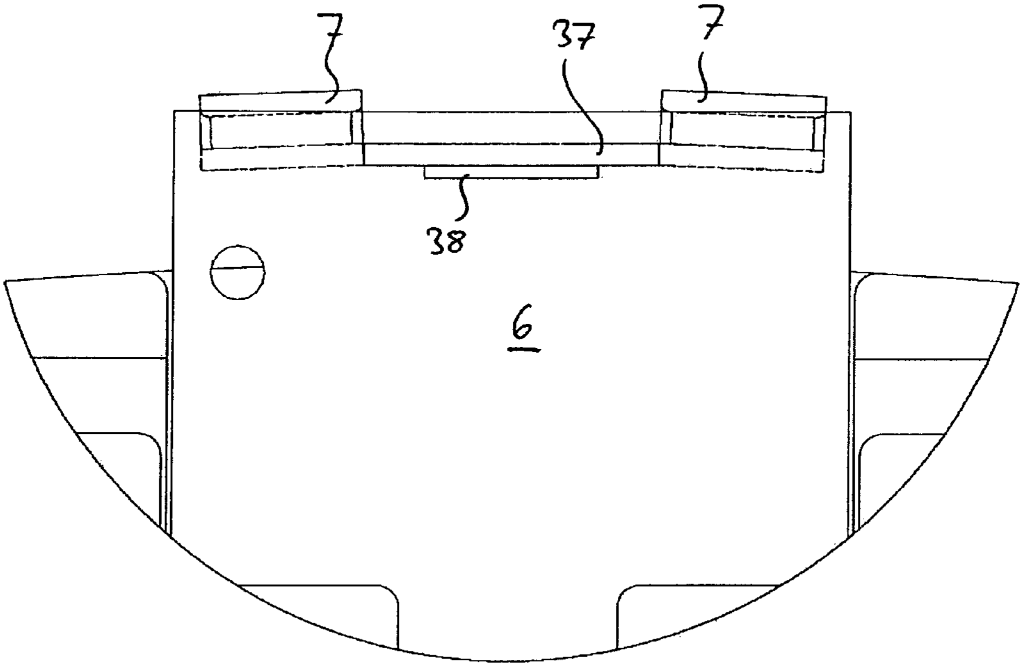

When the covering device 2 together with the safety device 1 is removed and the safety device 1 is correspondingly removed from the inner wall of the pipe 33, the slide moves further out due to the energy storage devices 29, wherein the magnet 24 via the reed contact 26 effects a signal based on which an alarm is emitted by the electronic control. In the position shown in FIG. 6, the slide 6 with its basis 36 is in its dead-center position in the guide 8, which is likewise visible by the abutment against the flanges 9.

After the safety device 1 has been removed from the pipe, the slide 6 can be pressed back into the housing again, whereupon the securing pin 16 can be inserted into the openings 31 and 32, so that the safety device is switched off. An alarm signal has already been emitted by this time, however. The safety device can then be equipped with a new energy storage device for maintenance and can be used again.

In the head of the slide 6, the magnets 7 are coupled via a preferably ferromagnetic oscillating body 37. This coupling on the one hand effects an improved magnetic holding of the slide 6 on the inner wall of the pipe and thus an improved recording of the structure-borne noise. Furthermore, a structure-borne noise sensor 38 is arranged on the oscillating body 37, which structure-borne noise sensor in this exemplary embodiment comprises a piezoelectric element. The slide 6 is thus on the one hand part of the displacement protector, part of the structure-borne noise detection device and furthermore serves to switch the protector on and off, whereby a plurality of functions are realized in one component.

The recorded signal is relayed from the structure-borne noise sensor via an electrical connection (not shown in further detail) to an evaluation unit on the printed circuit board 17. In the printed circuit board, the detected structure-borne noise is evaluated, for example filtered, and if certain criteria are met, an alarm signal is likewise emitted again.

Figure 8:
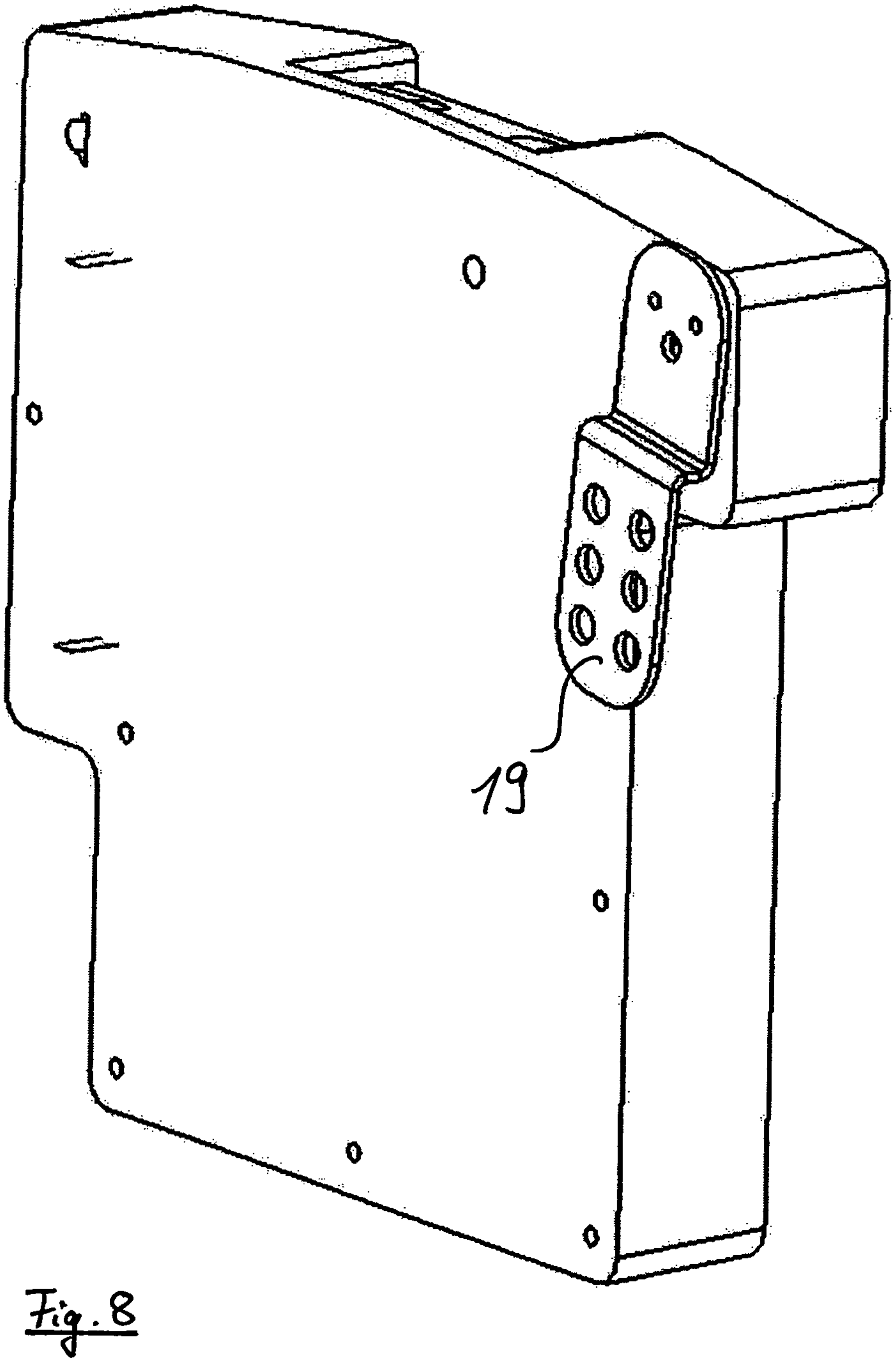

FIG. 8 shows the rear of the safety device, in which again the arrangement of the sheet 9 for contact with the conductor loop 10 can be seen.

In particular through the combination of individual aspects of a safety device described above, a safety device is created that can monitor a covering device or a pipe for pipes for pipeline construction well with a plurality of complementary functions.

What is claimed is:

1. Safety device for a covering device (2) of a pipe and for a pipe, which can be used with a row of further pipes in a form welded to one another for producing pipelines, wherein the covering device (2) covers one end of the pipe and comprises a sleeve (5) inserted into the pipe and covering an inner wall of the pipe, wherein the safety device (1) is embodied to generate an alarm signal, wherein the safety device (1) comprises a structure-borne sound detection device comprising a structure-borne noise sensor (38) for detecting tampering with the pipe by sensing noise resulting from tampering, wherein the structure-borne noise sensor (38) is arranged on the sleeve inside the pipe and contacts the inner wall of the pipe.

2. Safety device according to claim 1, wherein the structure-borne noise detection device has a piezoelectric element.

3. Safety device according to claim 1, wherein the structure-borne noise detection device has an oscillating body (37), which has a characteristic frequency adapted to the frequency range of the structure-borne noise to be detected.

4. Safety device according to claim 1, wherein the structure-borne noise detection device comprises at least one magnet (7) for holding at least one part (6) of the structure-borne noise detection device on the pipe.

5. Safety device according to claim 1, wherein the structure-borne noise detection device is embodied for the mechanical mounting of at least a part (6) of the structure-borne noise detection device on the pipe.

6. Safety device according to claim 1, wherein the safety device (1) is embodied for detecting tampering with the covering device (2).

7. Safety device according to claim 1, comprising an evaluation device that evaluates the signal recorded by the structure-borne noise sensor.

8. Safety device according to claim 1, comprising a displacement protector, which is embodied to detect a change in the position of the safety device (1) relative to the pipe to be monitored.

9. Safety device according to claim 8, wherein the displacement protector comprises a slide (6), and the safety device is embodied to emit an alarm signal at the displacement of the slide (6) into the dead-center position thereof.

10. Safety device according to claim 1, comprising a slide (8) that can be moved in a guide (8), wherein a signal can be produced at at least one position of the slide (6) along the guide (8).

11. Safety device according to claim 10, wherein the slide is subject to a force by means of an energy storage device (29).

12. Safety device according to claim 1, comprising a temperature sensor (27).

13. Safety device according to claim 12, wherein the temperature sensor (27) is arranged on an opposite end of the safety device with respect to the structure-borne noise sensor (38).

14. Safety device according to claim 13, wherein the temperature sensor (27) is attached via a clamp connection (28).

15. Safety device according to claim 1, comprising a gas probe and/or a sensor for detecting factors influencing corrosion embodied in particular as a moisture sensor and/or salt content sensor.

16. Safety device according to claim 1, comprising a protector embodied as a cutoff protector for detecting preferably mechanical damage to the covering device.

17. Safety device according to claim 16, wherein the cutoff protector has a conductor loop (10), which is attached to a membrane of the covering device.

18. Safety device according to claim 1, comprising a transmitter for emitting a radio signal.

19. Safety device according to claim 1, wherein the safety device is embodied to be switched on, switched off and/or destroyed upon an unequivocal signal.

20. Safety device according to claim 1, comprising an electronic control for communication by causing an alarm signal to be emitted.

21. Safety device according to claim 1, comprising an RFID component (21), which is preferably connected to an electronic control.

22. Safety device according to claim 1, comprising an embodiment making it possible to review the energy status of an associated energy source (21).

23. Safety device according to claim 1, comprising an autonomous energy supply.

24. Safety device according to claim 1, comprising a two-part housing, which embodies a sealed cavity for accommodating electronic components.

25. Safety device according to claim 1, comprising a housing that is formed of cast or injection-molded polyurethane.

26. System for monitoring pipes, comprising a plurality of safety devices (1) according to claim 1, with a receiving station for receiving the signals of the safety device (1) that can preferably be relayed by means of a repeater, with an electronic data processing system that is embodied to evaluate the signals and to emit an alarm signal.

27. System according to claim 26, comprising a first control station that at least in part comprises the electronic data processing system, and a second control station which is locally spaced apart and connected to the first control station via communication means preferably embodied as an Internet connection.

28. System according to claim 26, wherein the safety device is embodied to emit a daily control signal and/or an alarm signal that can be transmitted repeatedly until a confirmation signal arrives at the safety device from an electronic data processing system.

29. System according to claim 26, wherein the electronic data processing system is embodied to check the at least one repeater.

* * * * *